US008819191B2

(12) United States Patent
Hui et al.

(10) Patent No.: US 8,819,191 B2
(45) Date of Patent: Aug. 26, 2014

(54) EFFICIENT USE OF DYNAMIC HOST CONFIGURATION PROTOCOL IN LOW POWER AND LOSSY NETWORKS

(75) Inventors: Jonathan W. Hui, Foster City, CA (US); Lik Chuen Alec Woo, Union City, CA (US); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 418 days.

(21) Appl. No.: 13/180,952

(22) Filed: Jul. 12, 2011

(65) Prior Publication Data

US 2013/0018993 A1 Jan. 17, 2013

(51) Int. Cl.
*G06F 15/177* (2006.01)
(52) U.S. Cl.
USPC .......................................... 709/220
(58) Field of Classification Search
CPC ............ H04L 61/2015; H04L 61/2076; H04L 61/2589; H04L 41/12
USPC ............. 370/331, 395.31, 338, 390; 709/220, 709/232; 726/22; 713/162
See application file for complete search history.

(56) References Cited

U.S. PATENT DOCUMENTS

| 6,298,383 | B1 | 10/2001 | Gutman et al. |
| 6,434,134 | B1 * | 8/2002 | La Porta et al. ............... 370/338 |
| 7,152,117 | B1 | 12/2006 | Stapp et al. |
| 7,586,912 | B2 | 9/2009 | Agarwal et al. |
| 7,640,340 | B1 | 12/2009 | Stapp et al. |
| 7,711,826 | B2 | 5/2010 | Ford |
| 7,729,314 | B2 | 6/2010 | Siddiqi et al. |
| RE41,811 | E | 10/2010 | Gutman et al. |
| 7,882,169 | B1 | 2/2011 | Droms et al. |
| 8,054,805 | B2 * | 11/2011 | Xia et al. ..................... 370/331 |
| 8,260,888 | B2 * | 9/2012 | Zheng ........................... 709/220 |
| 8,589,582 | B2 * | 11/2013 | Melsen et al. ................ 709/232 |
| 2006/0140164 | A1 | 6/2006 | Patel et al. |
| 2006/0218252 | A1 | 9/2006 | Ford |
| 2009/0080399 | A1 | 3/2009 | Wang et al. |
| 2009/0092140 | A1 * | 4/2009 | Gibbons et al. .......... 370/395.31 |
| 2009/0141688 | A1 | 6/2009 | Leung et al. |
| 2009/0144809 | A1 | 6/2009 | Dommety et al. |
| 2010/0121944 | A1 | 5/2010 | Huang et al. |
| 2010/0215019 | A1 * | 8/2010 | Velev et al. ................... 370/331 |

(Continued)

OTHER PUBLICATIONS

PN795326GB, "Forwarding and Routing in Sensor Networks", Oct. 22, 2010, Toshiba Research Europe Limitied, 33 pages.*

(Continued)

*Primary Examiner* — Dustin Nguyen
(74) *Attorney, Agent, or Firm* — Edwards Wildman Palmer LLP; James M. Behmke; Stephen D. LeBarron

(57) ABSTRACT

In one embodiment, each of a plurality of devices in a computer network is configured to i) transmit a unicasted dynamic host configuration protocol (DHCP) solicit message to a neighbor device having a route to a border router as an assumed DHCP relay without regard to location of a DHCP server, and ii) operate as a DHCP relay to receive unicasted DHCP solicit messages and relay the solicit message to the border router of the network without regard to location of the DHCP server, and to relay a DHCP reply to a corresponding requestor device.

13 Claims, 9 Drawing Sheets

(56) References Cited

U.S. PATENT DOCUMENTS

| | | | |
|---|---|---|---|
| 2010/0299419 A1 | 11/2010 | Ramankutty et al. | |
| 2010/0313265 A1* | 12/2010 | Lin et al. | 726/22 |
| 2010/0325714 A1 | 12/2010 | Iyer et al. | |
| 2011/0004674 A1* | 1/2011 | Zheng | 709/220 |
| 2011/0099370 A1* | 4/2011 | Shen et al. | 713/162 |
| 2012/0314705 A1* | 12/2012 | Howard | 370/390 |

OTHER PUBLICATIONS

Winter, et al., "RPL: IPv6 Routing Protocol for Low Power and Lossy Networks", draft-ietf-roll-rpl-19, IEFT Internet-Draft; Mar. 2011, 164 pages.

R. Droms et al., "Dynamic Host Configuration Protocol for IPv6 (DHCPv6)", pp. 1-101 (IETF, "RFC 3315") (Jul. 2003).

\* cited by examiner

EFFICIENT USE OF DYNAMIC HOST CONFIGURATION PROTOCOL IN LOW POWER AND LOSSY NETWORKS

TECHNICAL FIELD

The present disclosure relates generally to computer networks, and, more particularly, to use of a Dynamic Host Configuration Protocol (DHCP) in Low power ad Lossy Networks (LLNs).

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. Internet Protocol (IP)-based LLNs in a "route-over" configuration define a link-local scope to be those nodes reachable using a single link transmission (e.g., wireless/radio or power-line communication, "PLC"). In cases where multiple radio transmission are required to reach a destination, all routing and forwarding occurs at the network layer using IP.

Devices in an IP-based mesh network, like any other IP network, require a certain amount of network- and application-layer configuration when joining a network. Such configuration information may include IP address assignment, Domain Name Services (DNS) server addresses, IP prefix delegation, etc. The Dynamic Host Configuration Protocol for IPv6 (DHCPv6) (generally described and known in the art through the Internet Engineering Task Force (IETF) "RFC 3315") provides a standard way to distribute configuration information to devices across a network. DHCPv6 may be used in a stateless configuration where parameters are distributed to requesting clients without maintaining per-client state (e.g., DNS server addresses). DHCPv6 may also be used in a stateful configuration where parameters are selected specifically for each requesting client and the server must maintain per-client state to remember what values were provided to which client.

In a route-over LLN, it is infeasible to place DHCPv6 servers within link-local scope of all devices in the LLN. Doing so would require all nodes to perform DHCPv6 Prefix Delegation, which would unnecessarily divide up the address space across all devices and make assumptions on the number of devices they can assign address too. In particular, the challenge with DHCPv6 is that it was fundamentally designed for Ethernet-like networks (e.g., Switched Ethernet, IEEE 802.11, etc.) that provide significant communication resources (e.g., large channel capacity, high throughput, efficient broadcast communication, etc.). In particular, DHCPv6 requires the use of link-local multicast to discover neighboring DHCPv6 Relay Agents or Servers. For example, DHCPv6 clients must transmit a Solicit message to a link-local multicast address. A device in a typical Smart Grid deployment may have hundreds of neighbors and a single Solicit message may cause hundreds of responses from neighboring devices.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
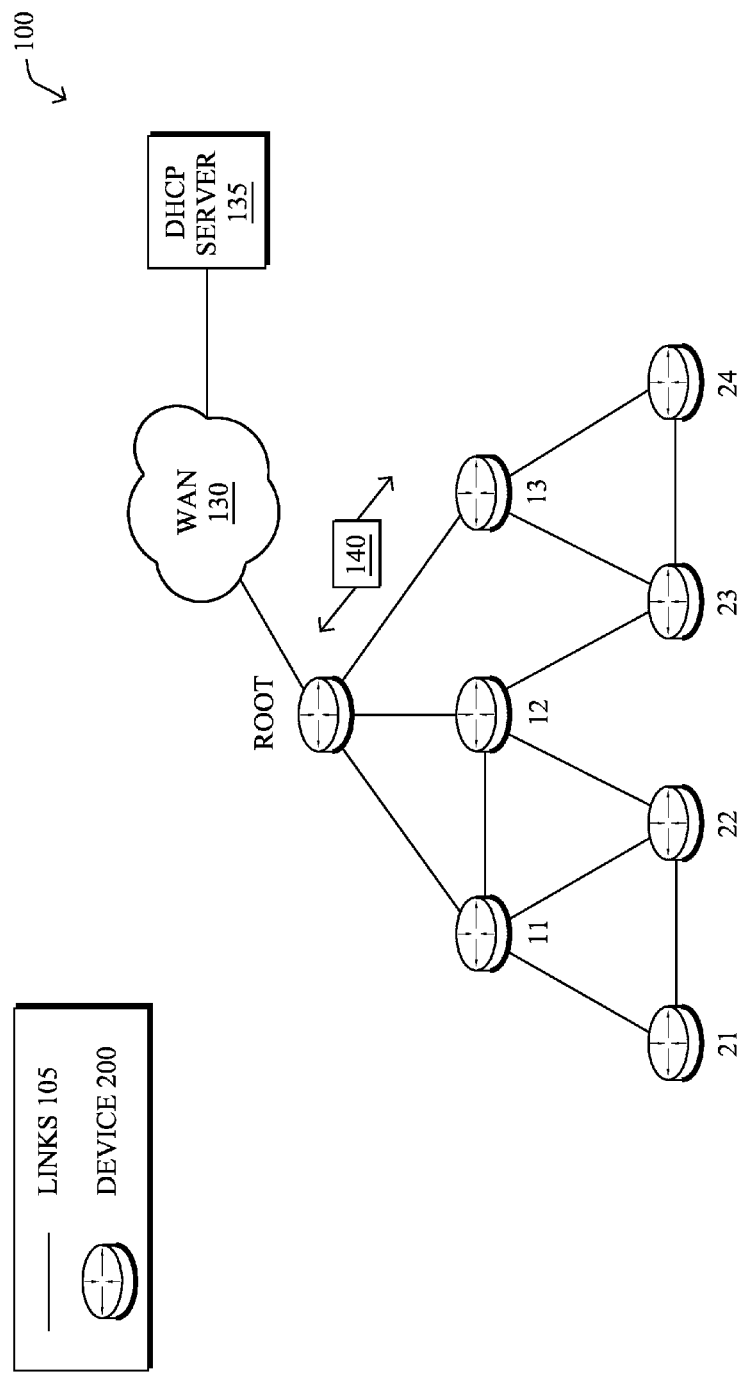
FIG. 1 illustrates an example computer network.

According to one or more embodiments of the disclosure, each of a plurality of devices in a computer network is configured to i) transmit a unicasted dynamic host configuration protocol (DHCP) solicit message to a neighbor device having a route to a border router as an assumed DHCP relay without regard to location of a DHCP server, and ii) operate as a DHCP relay to receive unicasted DHCP solicit messages and relay the solicit message to the border router of the network without regard to location of the DHCP server, and to relay a DHCP reply to a corresponding requestor device.

Specifically, according to one or more embodiments of the disclosure, a first device in a computer network advertises a route to a border router of the computer network to a second device, and may then receive a unicasted DHCP solicit message from a the second device (a requestor device). In response, the first device relays the solicit message to the border router of the network without regard to location of a DHCP server, and then relays a DHCP reply from the device to the requestor device.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "root," "11," "12," . . . "24," and described in FIG. 2 below) interconnected by various methods of communication. For instance, the links 105 may be shared media (e.g., wireless links, PLC links, etc.), where certain nodes 200, such as, e.g., routers, sensors, computers, etc., may be in communication with other nodes 200, e.g., based on distance, signal strength, current operational status, location, etc. Also, the root node may be configured to provide access for the local computer network (e.g., nodes 11-24) to and from a global computer network, e.g., WAN 130. Also, as described below, the WAN 130 may comprise or provide access to a "DHCP Server" 135. Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
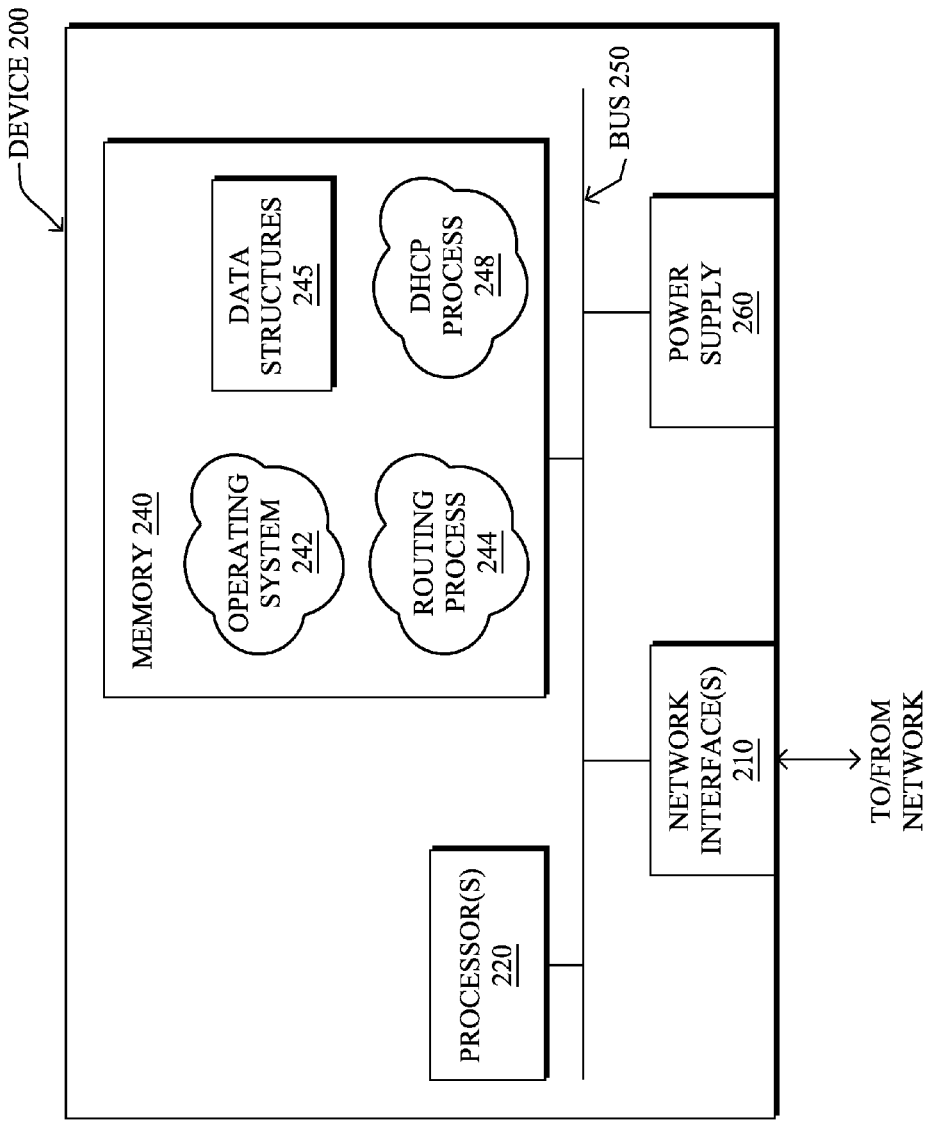
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative "DHCP process" 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

In particular, a DAG is a directed graph having the property that all edges are oriented in such a way that no cycles (loops) are supposed to exist. All edges are contained in paths oriented toward and terminating at one or more root nodes (e.g., "clusterheads or "sinks""), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by routing process 244) based on an Objective Function (OF). The role of the Objective Function is generally to specify rules on how to build the DAG (e.g. number of parents, backup parents, etc.).

As noted above, devices in an IP-based mesh network, like any other IP network, require a certain amount of network- and application-layer configuration when joining a network. Such configuration information may include IP address assignment, Domain Name Services (DNS) server addresses, IP prefix delegation, etc. The Dynamic Host Configuration Protocol for IPv6 (DHCPv6) (generally described and known in the art through the Internet Engineering Task Force (IETF) "RFC 3315") provides a standard way to distribute configuration information to devices across a network. DHCPv6 may be used in a stateless configuration where parameters are distributed to requesting clients without maintaining per-client state (e.g., DNS server addresses). DHCPv6 may also be used in a stateful configuration where parameters are selected specifically for each requesting client and the server must maintain per-client state to remember what values were provided to which client.

In a route-over LLN, it is infeasible to place DHCPv6 servers within link-local scope of all devices in the LLN. Doing so would require all nodes to perform DHCPv6 Prefix Delegation, which would unnecessarily divide up the address space across all devices and make assumptions on the number of devices they can assign address too. In particular, the challenge with DHCPv6 is that it was fundamentally designed for Ethernet-like networks (e.g., Switched Ethernet, IEEE 802.11, etc.) that provide significant communication resources (e.g., large channel capacity, high throughput, efficient broadcast communication, etc.). In particular, DHCPv6 requires the use of link-local multicast to discover neighboring DHCPv6 Relay Agents or Servers. For example, DHCPv6 clients must transmit a Solicit message to a link-local multicast address. A device in a typical Smart Grid deployment may have hundreds of neighbors and a single Solicit message may cause hundreds of responses from neighboring devices.

DHCP for LLNs

The techniques herein improve the efficiency of DHCP (e.g., DHCPv6) within an LLN while maintaining interoperability with a standard DHCPv6 server. As described in detail herein, this is achieved by: 1) pushing the DHCPv6 Server to the edge of the LLN (e.g. border router) or into a backend (e.g., datacenter) reachable over IP to maintain a central point of control; 2) implementing a DHCPv6 Relay on every LLN device to ensure that any device can relay messages for neighboring nodes; 3) having DHCPv6 Relays forward all client messages to the border router to remove need to discover and maintain the server's IP address; 4) having DHCPv6 Clients unicast Solicit messages to avoid unnecessary duplication in relaying the message; and 5) using the Rapid Commit option to avoid needing to maintain the ID of the DHCPv6 server and minimize the number of messages during an exchange with the server.

Specifically, according to one or more embodiments of the disclosure as described in detail below, each of a plurality of devices in a computer network is configured to i) transmit a unicasted DHCP solicit message to a neighbor device having a route to a border router as an assumed DHCP relay without regard to location of a DHCP server, and ii) operate as a DHCP relay to receive unicasted DHCP solicit messages and relay the solicit message to the border router of the network without regard to location of the DHCP server, and to relay a DHCP reply to a corresponding requestor device. That is, according to one or more embodiments of the disclosure, a first device in a computer network advertises a route to a border router of the computer network to a second device, and may then receive a unicasted DHCP solicit message from a the second device (a requestor device). In response, the first device relays the solicit message to the border router of the network without regard to location of a DHCP server, and then relays a DHCP reply from the device to the requestor device.

Illustratively, the techniques described herein may be performed by hardware, software, and/or firmware, such as in accordance with the DHCP process 248, which may contain computer executable instructions executed by the processor 220 to perform functions relating to the novel techniques described herein, e.g., in conjunction with routing process 244. For example, the techniques herein may be treated as extensions to conventional DHCP protocols (e.g., DHCPv6), and as such, may be processed by similar components understood in the art that execute those protocols, accordingly.

Operationally, in a route-over network, each device performs all routing and forwarding functions at the network layer using IP. As a result, destinations out of a single transmission range require the use of IP routing and forwarding to properly deliver packets/datagrams to them. RPL is one such IP-based routing protocol that is designed for LLNs. According to the techniques herein, a single DHCPv6 Server provides all configurations for a given LLN. The DHCPv6 Server may sit on the edge of an LLN (e.g., on an LLN border router, such as the root node) or a separate DHCP Server 135 in a backend environment (e.g., datacenter, NOC, etc.) reachable by the LLN over IP (e.g., via WAN 130).

According to the embodiments herein, all devices in the LLN are configured to operate as (implement) a DHCPv6 Relay. DHCPv6 is typically used to obtain global IPv6 addresses. As such, a DHCPv6 Client communicates with a neighboring device using link-local addresses. Because the physical topology of an LLN is difficult to predict and timevarying, having each device implement a DHCPv6 Relay gives ensures that all devices in the network can communicate with a DHCPv6 Relay.

Figure 3A:
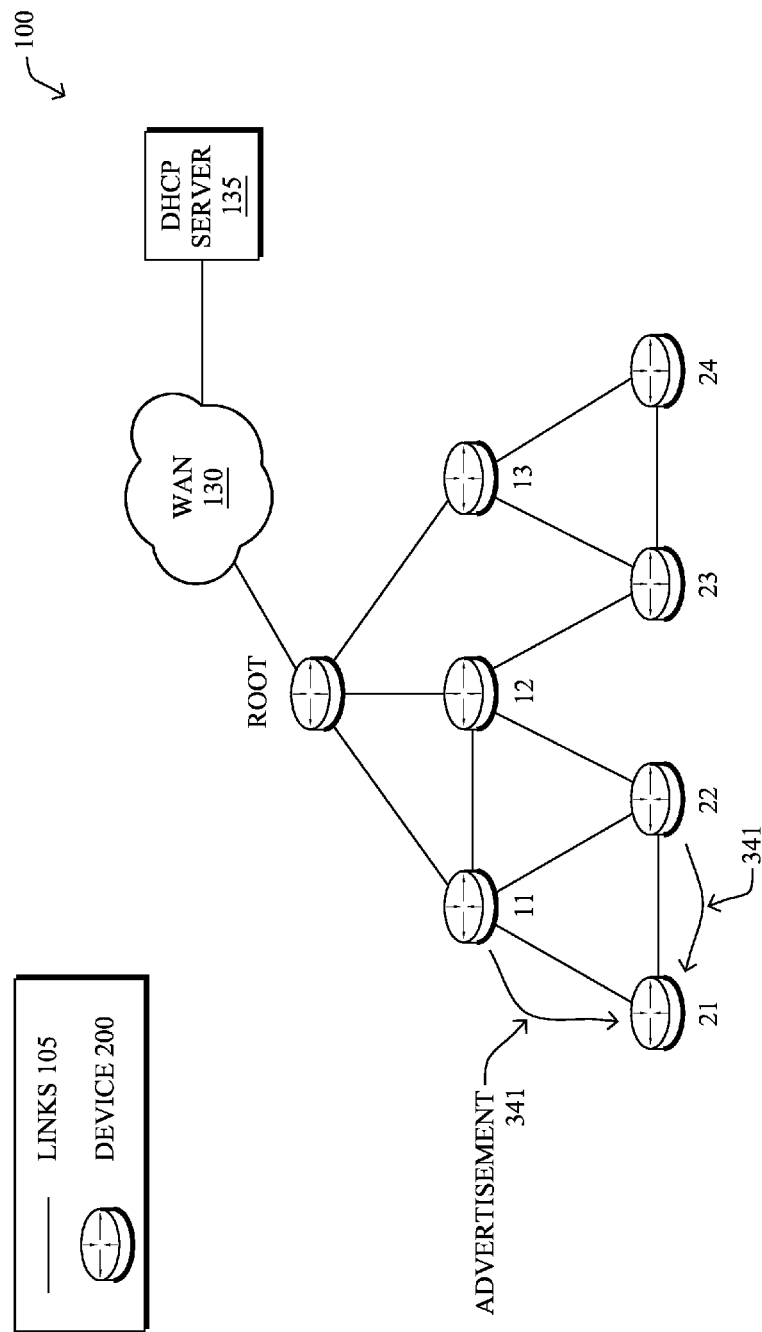
FIGS. 3A-3E illustrate an example of efficient dynamic host configuration protocol (DHCP) usage in the computer network.
Figure 3B:
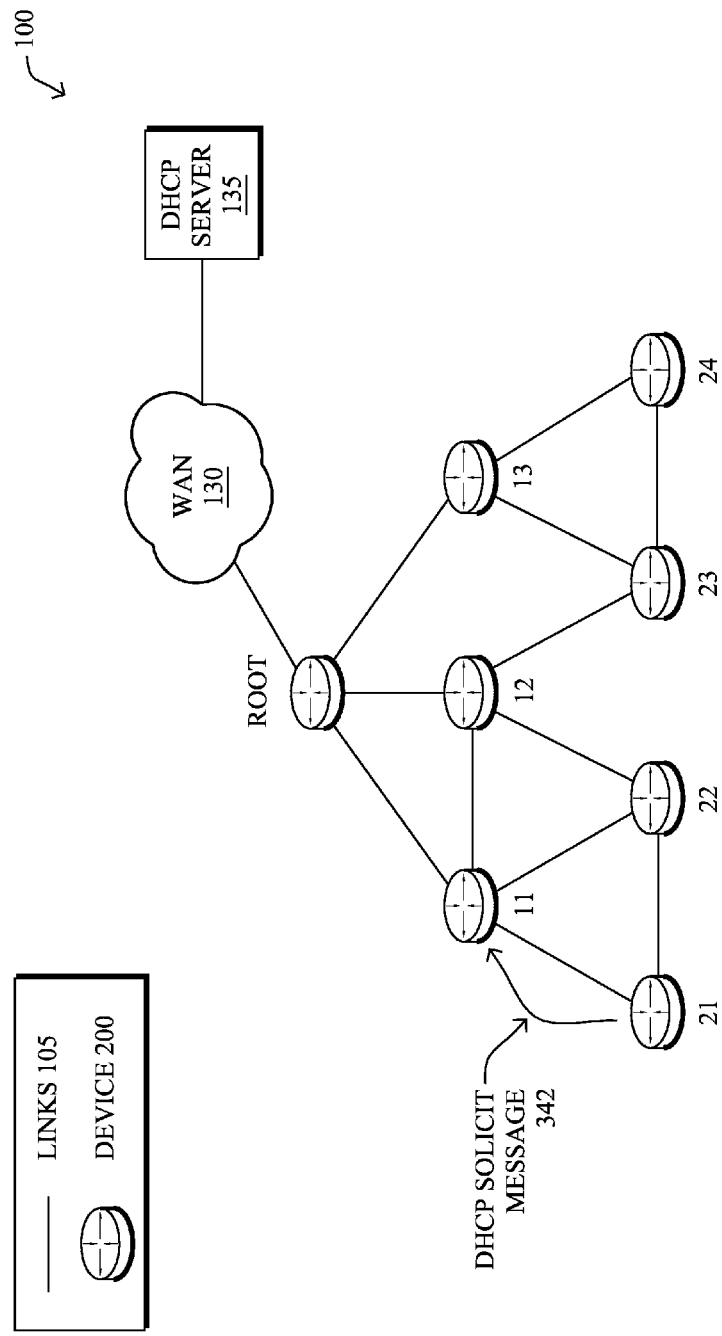
Figure 3C:
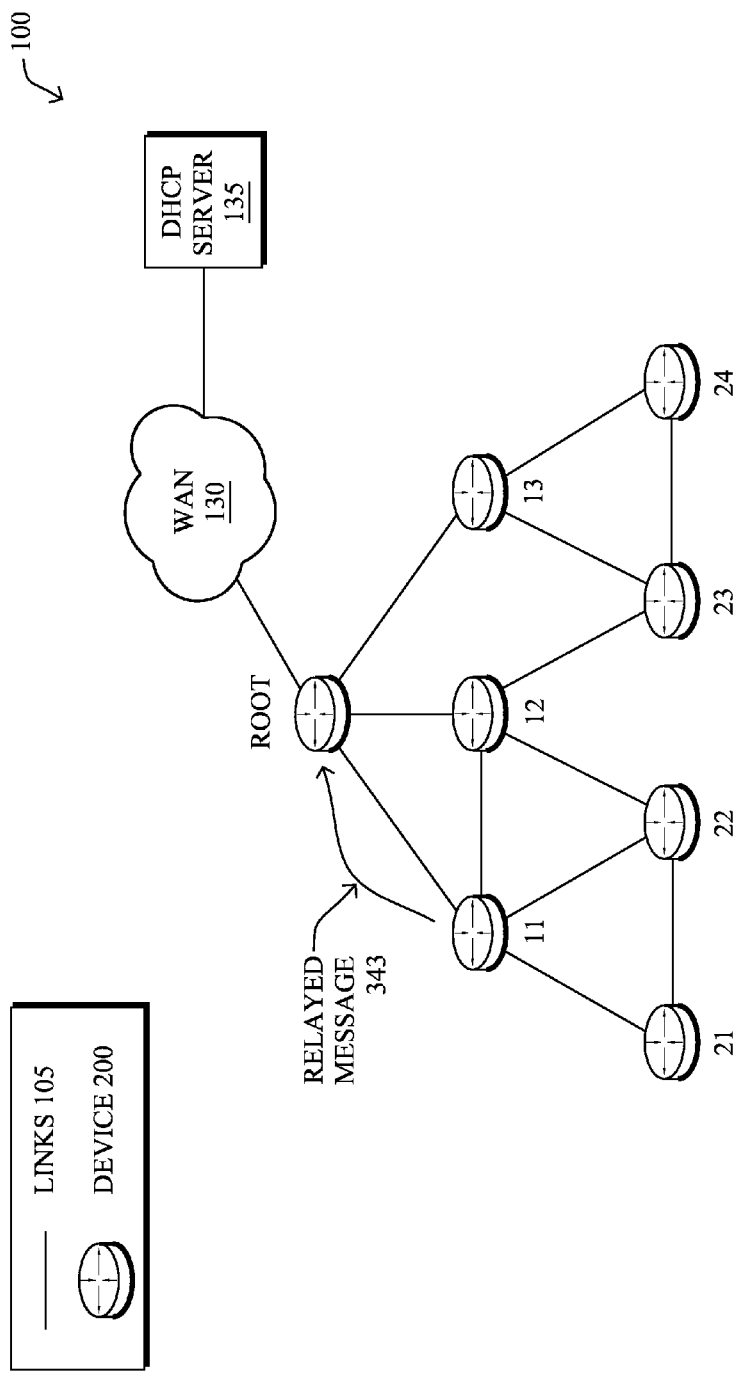
Figure 3D:
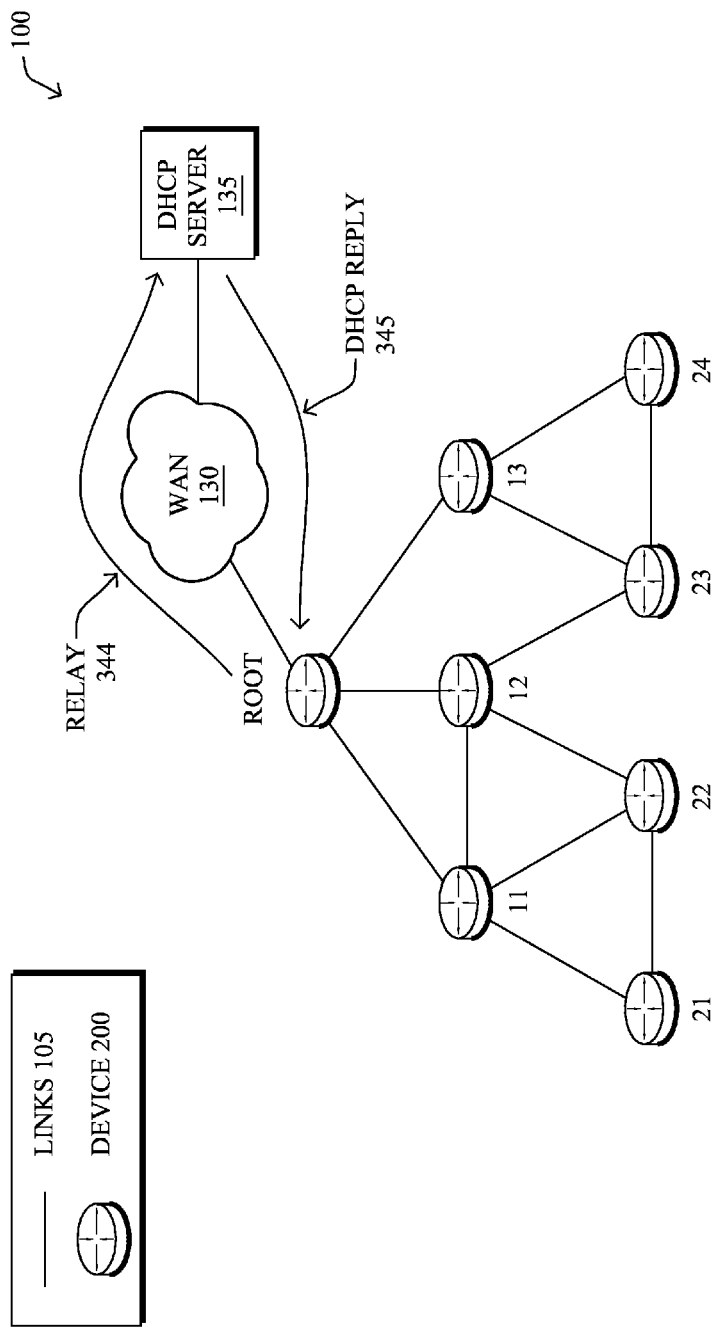

After advertising a route to a border router (advertisement 341 in FIG. 3A), a DHCPv6 relay device (e.g., node 11) may receive unicasted DHCP solicit messages 342 (FIG. 3B) from requestor devices (DHCP client devices, e.g., node 21). As shown in FIG. 3C, the DHCPv6 Relay device forwards client messages directly to the LLN border router using the LLN border router's IP address, thus relaying the solicit message (relay message 343) to the border router of the network without specific regard to the location of an actual DHCP server. When using RPL, for example, the IP address of the border router (root node) may be distributed using RPL "DODAG Information Object" (DIO) messages. The border router either implements the DHCPv6 Server or instead operates as a DHCPv6 Relay. If the border router implements a DHCPv6 Relay, then it is configured to relay client messages directly to the DHCPv6 Server 135 located outside of the local network beyond the border router using the server's IP address, as shown in FIG. 3D (relay message 344 and server reply 345).

By having each device forward client messages to the border router rather than the DHCPv6 server directly, the devices do not need to be configured with the DHCPv6 Server's IP address. Not only does this reduce the size of DHCPv6 Reply messages, but it significantly reduces the overhead of configuring or changing the DHCPv6 Server's IP addresses because it avoids communication over the resource-constrained network. Forwarding all DHCPv6 client messages to the border router effectively makes the DHCPv6 Relay a stateless process.

DHCPv6 Clients initiate requests by unicasting a DHCPv6 Solicit message 342, e.g., with the Rapid Commit option (described below), to any neighboring device that is advertising a route (advertisement 341). That is, the neighbor selected as a relay device must be advertising a route to the border router to ensure that the neighbor has connectivity to the border router.

Figure 3E:
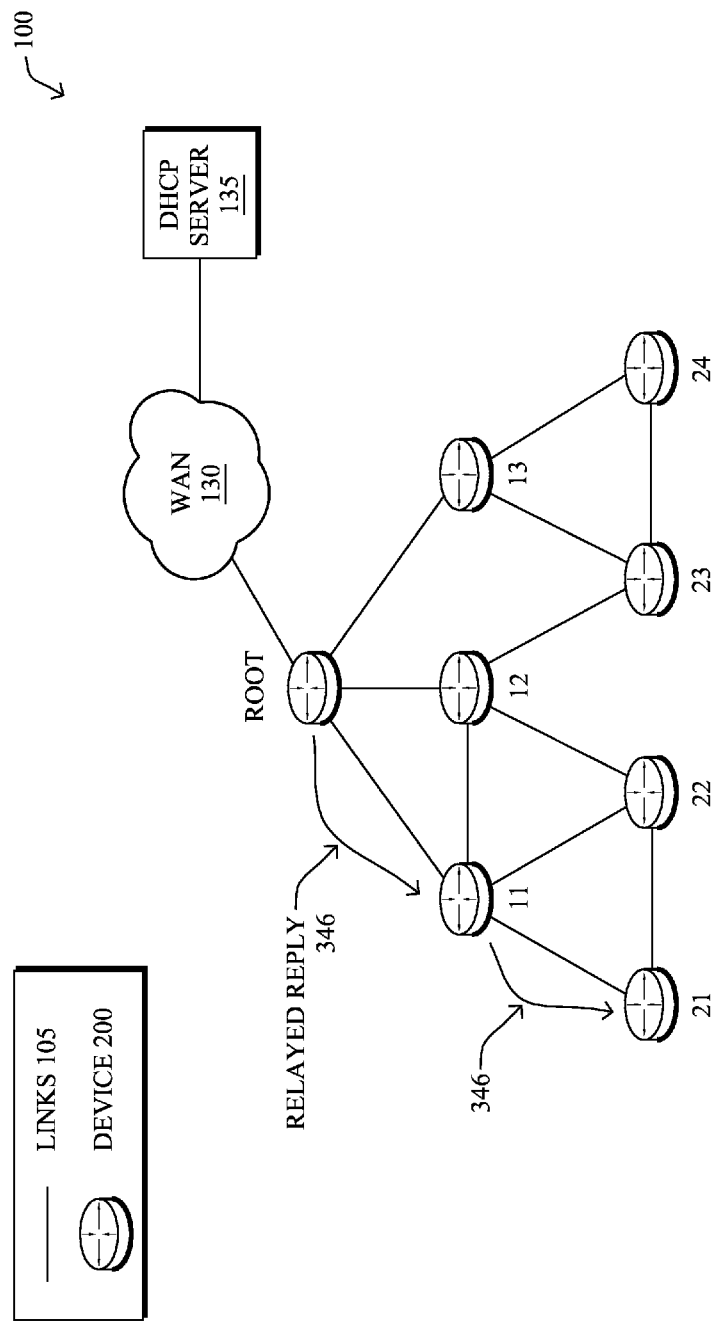

Note that the use of unicast communication differs from RFC 3315, which requires all Solicit messages to be sent using multicast communication. Because unicast solicitations are explicitly disallowed in RFC 3315, DHCPv6 Relays in the LLN must be modified to allow for such unicast solicitations. Unicast communication, in particular, is often preferred to broadcast communication in LLNs because unicast is more efficient. In frequency-hopping (channel-hopping) networks, unicast communication between a transmitter-receiver pair can utilize a channel schedule independent of other transmitter-receiver pairs. In contrast, a broadcast medium is typically shared with all other neighboring devices. An additional problem with multicast is that multiple neighboring devices will forward the same message, which is wasteful. With unicast, on the other hand, only a single DHCPv6 Relay selected by the Client will forward the Solicit message toward the server, and relaying a DHCP reply (relayed reply 346 as in FIG. 3E) to the initiating requestor/client device.

Using the Rapid Commit option in Solicit messages 342 as mentioned above may reduce the DHCPv6 exchange to two messages, rather than the traditional four-message "Solicit-Advertise-Request-Reply" exchange as described in RFC 3315. When indicated within the solicit message 342, therefore, the only received message in response to the solicit message 342 is the relayed reply 346. Note that the use of the rapid commit option also removes the need for the DHCPv6 client to maintain the DHCP unique ID (DUID) of the DHCPv6 Server, as may be appreciated by those skilled in the art.

Figure 4:
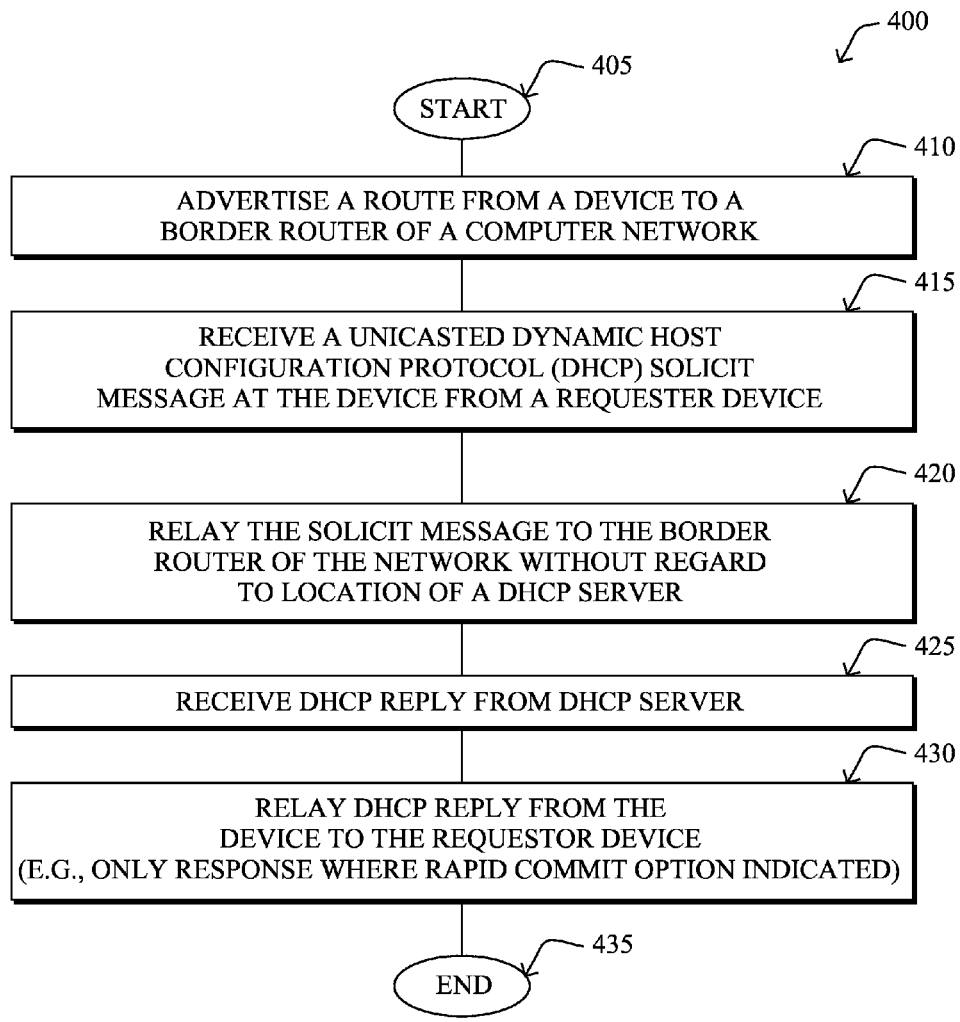
FIG. 4 illustrates an example simplified procedure for efficiently using DHCP in the computer network from the perspective of a device as a DHCP relay.

FIG. 4 illustrates an example simplified procedure for efficiently using DHCP in the computer network from the perspective of a device as a DHCP relay in accordance with one or more embodiments described herein. The procedure 400 starts at step 405, and continues to step 410, where a device (e.g., node 11) advertises a route to a border router of a local computer network, e.g., to the root node. As described in greater detail above, in step 415 the device, which is configured to operate as a DHCP relay, receives a unicasted DHCP solicit message 342 from a requestor device (e.g., node 21). The DHCP relay device then relays the solicit message (relay message 343) to the border router of the network without regard to location of a DHCP server. As noted above, the border router is either configured as a DHCP server, or as a DHCP relay with actual knowledge of the DHCP server 135's location via WAN 130.

In step 425, the DHCP relay device (node 11) receives a DHCP reply 345/346 from the DHCP server as described above, and then relays the reply to the requestor device in step 430. Note that as mentioned above, the reply 346 to the requestor may generally be the only response, such as where the rapid commit option was indicated in the initial solicit message 342. The procedure ends in step 435.

Figure 5:
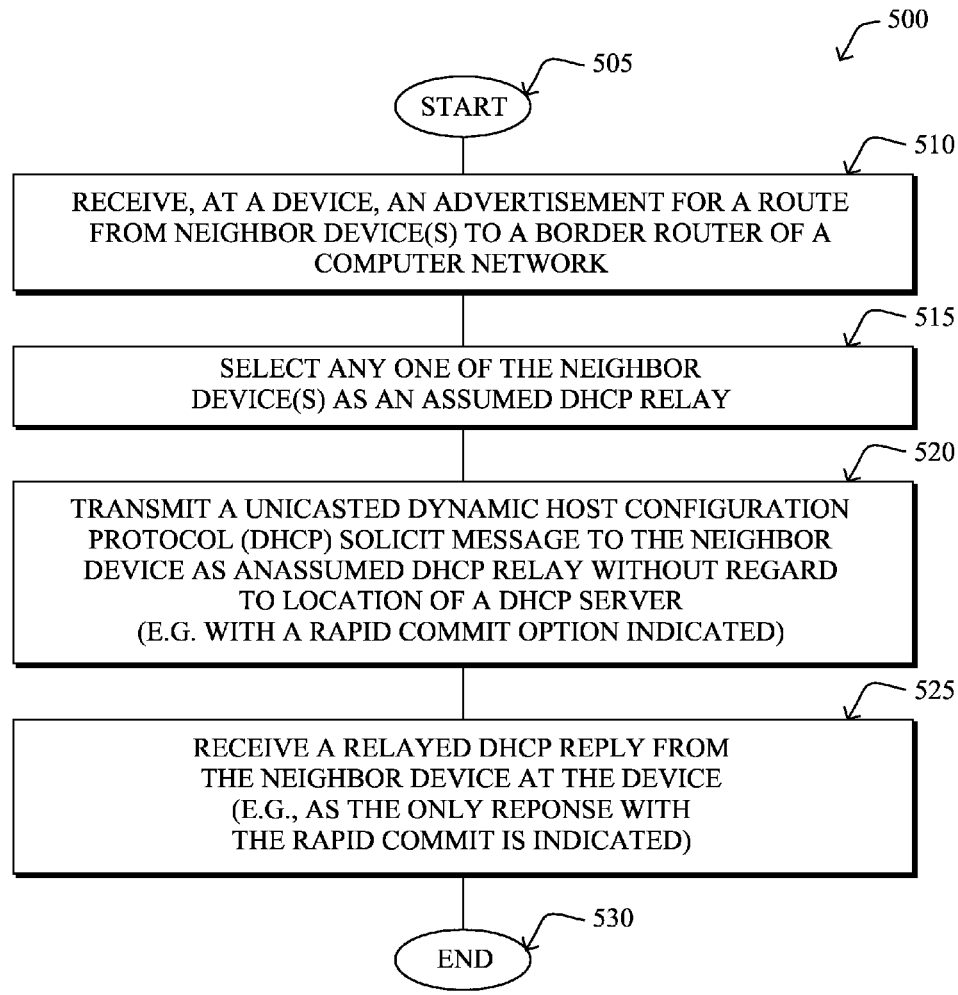
FIG. 5 illustrates an example simplified procedure for efficiently using DHCP in the computer network from the perspective of a device as a DHCP client.

In addition, FIG. 5 illustrates an example simplified procedure for efficiently using DHCP in the computer network from the perspective of a device as a DHCP client in accordance with one or more embodiments described herein. The procedure 500 starts at step 505, and continues to step 510, where the DHCP client device (e.g., node 21) receives an advertisement 341 for a route from one or more neighbor devices (e.g., nodes 11 and 22) to a border router of the local computer network. In step 515, the client device may select any one of the neighbor device(s) as an assumed DHCP relay, and transmits a unicasted DHCP solicit message 342 in step 520 to the selected neighbor device as an assumed DHCP relay without regard to location of a DHCP server.

In step 535, the client device may receive a relayed DHCP reply 346 from the neighbor device with the desired DHCP information. As mentioned above, the solicit message 342 may indicate a rapid commit option, in which case the reply 346 is the only response to the solicit message 342. The procedure 500 ends in step 530, notably with the option for the DHCP client device to now act as a DHCP relay device for other client devices, as in FIG. 4 above.

It should be noted that while certain steps within procedures 400-500 may be optional as described above, the steps shown in FIGS. 4-5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 400-500 are described separately, certain steps from each procedure may be incorporated into each other procedure, and the procedures are not meant to be mutually exclusive.

The novel techniques described herein, therefore, provide for efficient DHCP for LLNs. In particular, by configuring each device in an LLN as a DHCP relay, the techniques herein allow interoperability with a standard DHCPv6 Server to provide configurations to LLN devices, which is particularly beneficial to provide central administrative control over the distribution of configuration information into an LLN. Also, by utilizing unicast transmissions (e.g., for solicit messages), since broadcast communication is often costly in LLNs, transmission overhead of DHCPv6 is minimized, and duplicate replies are essentially eliminated. Moreover, implementing a DHCPv6 Relay or Server in the border router, and forwarding all DHCP client messages to the border router, eliminates communication and state overhead in maintaining the DHCP Server's IP address among devices in the LLN. Furthermore, the use of rapid commit option minimizes message overhead, as well as state overhead by avoiding the need to maintain the DHCP Server's DHCP unique ID (DUID).

While there have been shown and described illustrative embodiments that provide for efficient DHCP for LLNs, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of constrained network and/or associated protocols. For instance, while RPL is used as an illustrative protocol, such that the border router is a root node of a DAG, other suitable protocols may be used in the computer network herein. Also, while the techniques are generally described according to DHCPv6 (RFC 3315), protocols similar to DHCPv6 may be used, and as such, the use of "DHCP" is merely an illustrative example protocol for dynamically configuring hosts, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   advertising a route from a device to a border router of a computer network;
   receiving a unicasted dynamic host configuration protocol (DHCP) solicit message at the device from a requestor device;
   relaying the solicit message to the border router of the network without regard to location of a DHCP server; and
   relaying a DHCP reply from the device to the requestor device;
   wherein the border router is a root node of a directed acyclic graph (DAG).

2. The method as in claim 1, wherein the border router is the DHCP server.

3. The method as in claim 1, wherein the DHCP server is located outside of the network beyond the border router.

4. The method as in claim 1, wherein the received solicit message indicates a rapid commit option, the method further comprising:
   responding to the solicit message with only the relayed reply.

5. The method as in claim 1, wherein the DHCP is DHCP for Internet Protocol version 6 (DHCPv6).

6. The method as in claim 1, wherein network is a low power and lossy network (LLN).

7. An apparatus, comprising:
   one or more network interfaces to communicate in a computer network;
   a processor coupled to the network interfaces and adapted to execute one or more processes; and
   a memory configured to store a process executable by the processor, the process when executed operable to:
   advertise a route to a border router of the computer network;
   receive a unicasted dynamic host configuration protocol (DHCP) solicit message from a requestor device;
   relay the solicit message to the border router of the network without regard to location of a DHCP server; and
   relay a DHCP reply to the requestor device;
   wherein the border router is a root node of a directed acyclic graph (DAG).

8. The apparatus as in claim 7, wherein the border router is the DHCP server.

9. The apparatus as in claim 7, wherein the DHCP server is located outside of the network beyond the border router.

10. The apparatus as in claim 7, wherein the received solicit message indicates a rapid commit option, wherein the process when executed is further operable to:
    respond to the solicit message with only the relayed reply.

11. The apparatus as in claim 7, wherein the DHCP is DHCP for Internet Protocol version 6 (DHCPv6).

12. A system, comprising:
    a border router for a local computer network, the border router configured to provide access between the local computer network and a global computer network; and
    a plurality of devices in the local computer network;
    wherein:
    i) each of the plurality of devices is configured to transmit a unicasted dynamic host configuration protocol (DHCP) solicit message to a neighbor device having a route to the border router as an assumed DHCP relay without regard to location of a DHCP server;
    ii) each of the plurality of devices is configured as a DHCP relay to receive unicasted DHCP solicit messages and relay the solicit message to the border router of the network without regard to location of the DHCP server, and to relay a DHCP reply to a corresponding requestor device;
    wherein the border router is a root node of a directed acyclic graph (DAG).

13. The system as in claim 12, wherein each solicit message indicates a rapid commit option, and wherein the solicit message is responded to with only the relayed DHCP reply.

* * * * *